Patented Oct. 7, 1924.

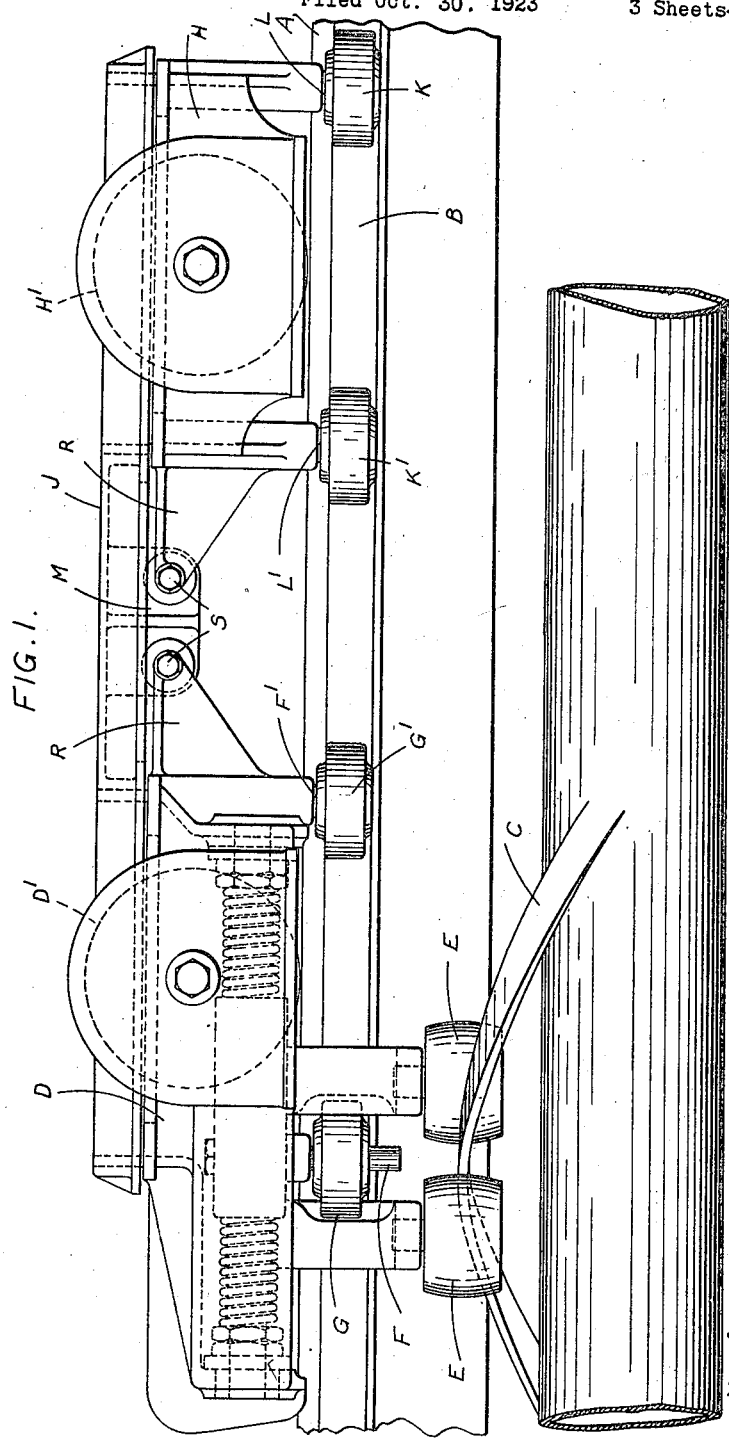

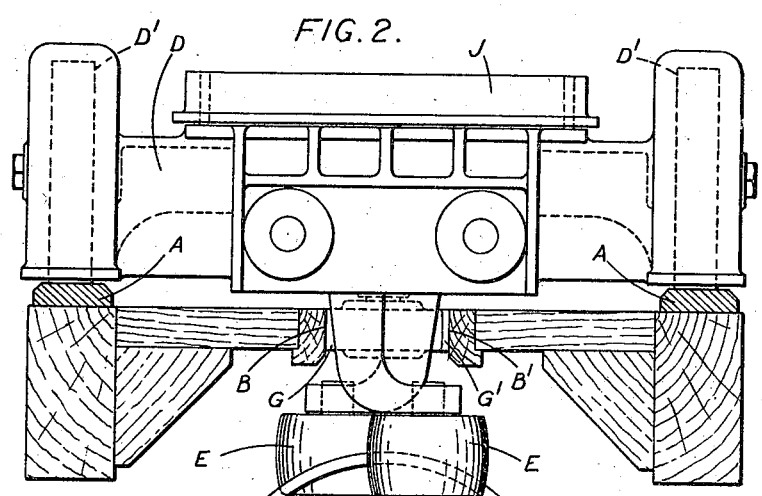
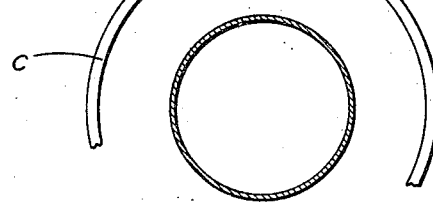
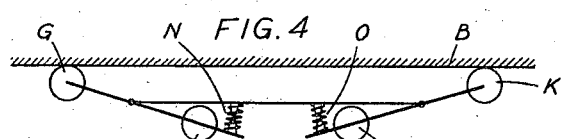
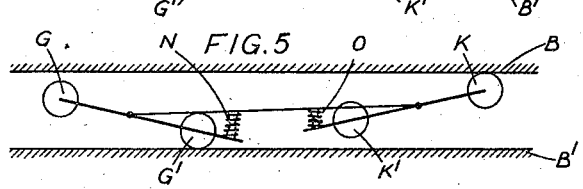
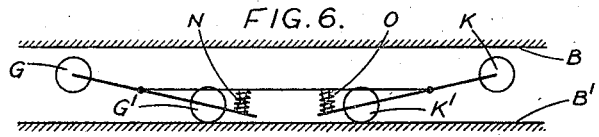

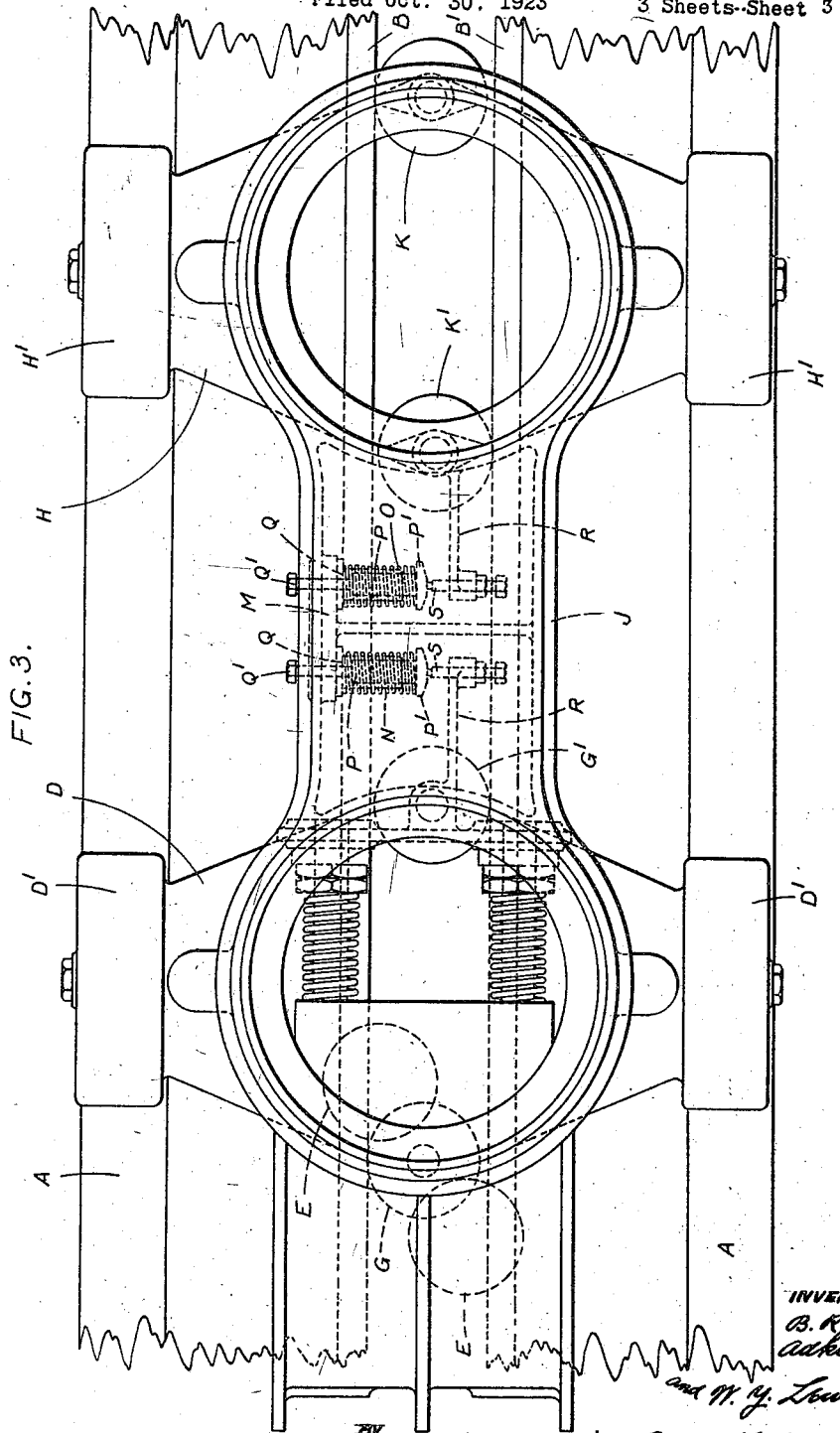

1,511,011

UNITED STATES PATENT OFFICE.

BENJAMIN RATCLIFFE ADKINS, OF UPPER WARLINGHAM, AND WILLIAM YORATH LEWIS, OF SOUTHEND-ON-SEA, ENGLAND.

CONVEYING APPARATUS.

Application filed October 30, 1923. Serial No. 671,778.

*To all whom it may concern:*

Be it known that we, BENJAMIN RATCLIFFE ADKINS and WILLIAM YORATH LEWIS, both subjects of the King of England, and residing, respectively, at Upper Warlingham, Surrey, in England, and Southend-on-Sea, Essex, in England, have invented certain new and useful Improvements in Conveying Apparatus, of which the following is a specification.

This invention relates to conveying apparatus of the type in which cars or trucks or the like are supported on wheels running on track rails and are provided with rollers adapted to engage with the sides of a central guide track or slot disposed between the track rails, and has for its object to effect improvements in such apparatus more particularly with respect to the control of the rollers engaging with the central guide track. For convenience the term "truck" will be employed in this specification to designate the cars or other bodies conveyed.

According to the present invention the truck has a pair of thrust or guide rollers adapted to engage respectively with the two sides of the central guide track and one or more springs or the like are provided which tend to maintain the rollers in contact with the sides of the guide track with which they are adapted to engage. Conveniently a second truck is connected to the driving truck and carries a pair of guide rollers similarly engaging with the sides of the guide track, springs or the like being provided which tend to maintain each roller in contact with the side of the guide track with which it engages. In addition to the springs a stop or stops may be provided which are so disposed as to limit the movement of each roller away from the side of the guide track with which it engages and thereby to prevent the roller from coming into contact with the opposite side of the track.

The invention is more especially applicable to screw conveying apparatus, in which motion is imparted to the trucks from a continuously rotating screwthread having a varying pitch, and a preferred construction according to this invention as applied thereto is illustrated in the accompanying drawings, in which—

Figure 1 shows in side elevation a driving truck and a trailing truck, one side of the track being removed to show the rollers more clearly.

Figures 2 and 3 are respectively a front elevation and a plan of the arrangement shown in Figure 1, and Figures 4, 5 and 6 illustrate diagrammatically the disposition of the rollers in the central guide track in various positions.

In these drawings, the track comprises two supporting rails A A and a central longitudinal slot, the two sides B B' of which form a guide track disposed between these rails. The varying pitch screwthread C, which serves to impart motion to the trucks, is disposed beneath the central guide track B B'. The driving truck D, which carries driving rollers E E engaging with the screwthread C, is supported on wheels D' running on the track rails A A and is provided with two downwardly projecting spindles F F', on which are mounted respectively two thrust rollers G G', the roller G being adapted to engage the side B of the central guide track and the roller G' the side B'.

In the case illustrated when two trucks are coupled together the driving truck D preferably has two supporting wheels D' only, one on each track rail and the trailing truck H is similarly supported on the wheels H'. The two trucks D and H are connected together by means of a bridge piece J pivotally mounted on each truck this bridge piece conveniently serving to support a car body. The trailing truck H is unprovided with driving rollers engaging with the screwthread C, but carries a pair of guide rollers K K' which are mounted on downwardly projecting spindles L L' and respectively engage the two sides B B' of the central guide track. The thrust rollers G G' on the driving truck D and the guide rollers K K' on the trailing truck H are so arranged that the front thrust roller G and the back guide roller K engage with the same side B of the guide track, say the right-hand side, whilst the back thrust roller G' and the front guide roller K' engage with the left-hand side B' as shown in Figure 4 which represents the normal running position.

On the inner side of a plate M which extends downwards from the right-hand side of the bridge piece J, two helical springs N O are mounted, one end of each of which abuts against the plate M whilst the other end presses against a flange P' on a guide member P disposed within the spring and passing through the plate M. Each guide member P is provided with a shoulder Q, which engages with the inner surface of the plate M and thereby limits movement of the member towards the plate and compresses the spring, and also carries a nut Q' on its outer end which similarly limits movement of the member away from the plate M under the action of the expansion of the spring. Each truck carries an arm R, having at its end a screwthreaded hole through which a stud S is passed to engage with the head of one of the guide members P. Each spring N or O thus exerts a pressure on the flange P' of the corresponding guide member P and this pressure is transmitted through the stud S and the arm R to one or other of the trucks in such a manner as to tend to maintain the thrust rollers G G' or guide rollers K K' in contact respectively with the sides B B' of the central guide track. This pressure may be adjusted to suit requirements by screwing up or unscrewing the studs S engaging with the heads of the guide members P. Owing to the provision of shoulders Q on the guide members P, movement of the studs S in a direction to compress the springs is limited, and these parts are so adjusted that it is impossible for any one of the four rollers G G' K K' to come into contact with the opposite side of the guide track. This may be ensured by arranging that the thrust and guide rollers can never get into line with one another.

It will be seen that the arrangement only limits the relative rotational movement of the trucks in one direction, movement in the other direction being left free to enable the trucks to swing round at the end of the track from the "up" line to the "down" line or vice versa as the case may be.

The pressure of the springs N O is arranged to be sufficient to counteract opposing forces due to the angular drive from the screwthread, wind pressure acting on the trucks, centrifugal force when rounding curves, and other causes tending to produce lateral thrusts on the rollers. Thus when the driving rollers E on the driving truck encounter an increase in the pitch of the screwthread C and the truck is thereby accelerated or when negotiating heavy up grades, there will be a lateral component force on the thrust rollers due to the angular drive of the screwthread, and this force will tend to cause the front thrust roller G and the front guide roller K' to come out of engagement with the corresponding sides B or B' of the central guide track. This condition is illustrated in Figure 5. The springs N O will tend to counteract this movement, but if the force is large enough the springs will be compressed and the shoulders Q on the guide members P will be forced against the plate M on the bridge piece J, thus stopping further motion of the rollers and preventing them from coming into contact with the other side of the guide track.

Similarly wind pressure on the trucks or the centrifugal force when rounding curves, will tend to move either the front guide roller K' and the back thrust roller G' or the front thrust roller G and the back guide roller K out of engagement with the guide track, such movement being counteracted by the springs. This condition is shown in Figure 6. If the force be large enough, the stops formed by the shoulders Q on the guide members P will come into action and arrest further movement, thus preventing the rollers from coming into contact with the other side of the guide track.

Although the invention has been described primarily with reference to a construction employing a driving truck and a trailing truck, it will be understood that the invention may also be applied to the case when the second truck is coupled in front of the driving truck, or when a single truck is used. In the latter case only one spring will be required.

It will be understood that the particular construction described has been given by way of example only and that modifications may be made without departing from the scope of the invention. Thus, any known form of resilient devices may be employed in the place of springs, and the stops may be formed in other ways than by providing shoulders on the guide members, if desired.

What we claim as our invention and desire to secure by Letters Patent is:—

1. In conveying apparatus, the combination of two supporting track rails, a central guide track disposed between the track rails, a truck supported on wheels running on the track rails, a pair of rollers carried by the truck and adapted to engage respectively with the two sides of the central guide track, and a resilient device tending to maintain the rollers in contact with the sides of the guide track with which they are adapted to engage as set forth.

2. In conveying apparatus, the combination of two supporting track rails, a central guide track disposed between the track rails, a driving truck supported on wheels running on the track rails, a pair of thrust rollers carried by the driving truck and adapted to engage respectively with the two sides of the central guide track, a second truck connected to the driving truck and similarly supported on wheels running on the track rails, a pair of guide rollers carried by the second truck and adapted to engage respectively with the two sides of the central guide track, and a resilient device tending to maintain the rollers in contact with the sides of the guide track with which they are adapted to engage as set forth.

3. In conveying apparatus, the combination of two supporting track rails, a central guide track disposed between the track rails, a truck supported on wheels running on the track rails, a pair of rollers carried by the truck and adapted to engage respectively with the two sides of the central guide track, a resilient device tending to maintain the rollers in contact with the sides of the guide track with which they are adapted to engage, and means for limiting the movement of each roller away from the side of the guide track with which it engages so as to prevent the roller from coming into contact with the other side of the guide track as set forth.

4. In conveying apparatus, the combination of two supporting track rails, a central guide track disposed between the track rails, a driving truck supported on wheels running on the track rails, a pair of thrust rollers carried by the driving truck and adapted to engage respectively with the two sides of the central guide track, a second truck connected to the driving truck and similarly supported on wheels running on the track rails, a pair of guide rollers carried by the second truck and adapted to engage respectively with the two sides of the central guide track, springs tending to maintain the rollers in contact with the sides of the guide track with which they engage, and means for limiting the movement of each roller away from the side of the guide track with which it engages so as to prevent the roller from coming into contact with the other side of the guide track as set forth.

5. In conveying apparatus, the combination of two supporting track rails, a central guide track disposed between the track rails, two trucks each supported on wheels running on the track rails, a bridge member pivotally connecting the two trucks, a pair of rollers carried by each truck the two rollers of each pair being adapted to engage respectively with the sides of the central guide track, an arm fixed to each truck and a spring disposed between each arm and the bridge member and tending to maintain the rollers in contact with the sides of the guide track with which they are adapted to engage as set forth.

6. In conveying apparatus, the combination of two supporting track rails, a central guide track disposed between the track rails, two trucks each supported on wheels running on the track rails, a bridge member pivotally connecting the two trucks, a pair of rollers carried by each truck the two rollers of each pair being adapted to engage respectively with the sides of the central guide track, an arm fixed to each truck, a spring disposed between each arm and the bridge member and tending to maintain the rollers in contact with the sides of the guide track with which they are adapted to engage, and stops carried by the bridge member and so disposed as to limit relative movement in one direction between the end of each arm and the bridge member as set forth.

In testimony whereof we have signed our names to this specification.

BENJAMIN RATCLIFFE ADKINS.
WILLIAM YORATH LEWIS.